(12) United States Patent
Green (10) Patent No.: US 6,362,774 B1
(45) Date of Patent: Mar. 26, 2002

(54) COOPERATIVE RADAR SYSTEM

(75) Inventor: Leon Green, Framingham, MA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/583,356

(22) Filed: May 31, 2000

(51) Int. Cl.[7] .......................... G01S 13/87; G01S 13/00
(52) U.S. Cl. ............................ 342/59; 342/74; 342/81; 342/175; 342/195
(58) Field of Search ............................. 342/59, 73, 74, 342/81, 104, 105, 109–112, 175, 195

(56) References Cited

U.S. PATENT DOCUMENTS 2,451,822 A  * 10/1948  Guanella .................... 342/112
3,161,870 A  * 12/1964  Pincoffs ...................... 342/59

* cited by examiner

Primary Examiner—Bernarr E. Gregory
(74) Attorney, Agent, or Firm—Daly, Crowley & Mofford, LLP (57) ABSTRACT

A multi-faced radar system illuminates a common area of space by radiating a first signal at a first frequency from a first antenna face and a second signal at a second frequency from a second antenna face and cooperatively processes the first and second signal returns on the first and second antenna faces. A processor combines first signal energy from the first and second faces and combines second signal energy from the first and second faces. The processor then combines the aggregate first and second signal returns. The cooperative processing of the first and second signals on the first and second antenna faces increases signal sensitivity and dramatically reduces the time on target required for relatively high scan angles,

20 Claims, 6 Drawing Sheets

*FIG. 1*

PRIOR ART

COOPERATIVE RADAR SYSTEM

STATEMENT REGARDING FEDERALLY SPONSORED RESEARCH

The government may have certain rights in the invention pursuant to Contract No. N39997-99-9-375A, awarded by sponsoring agency Naval Sea Systems Support Detachment.

CROSS REFERENCE TO RELATED APPLICATIONS

Not Applicable.

FIELD OF THE INVENTION

The present invention relates generally to radar, and more particularly, to radar systems having a plurality of antennas.

BACKGROUND OF THE INVENTION

Figure 1:
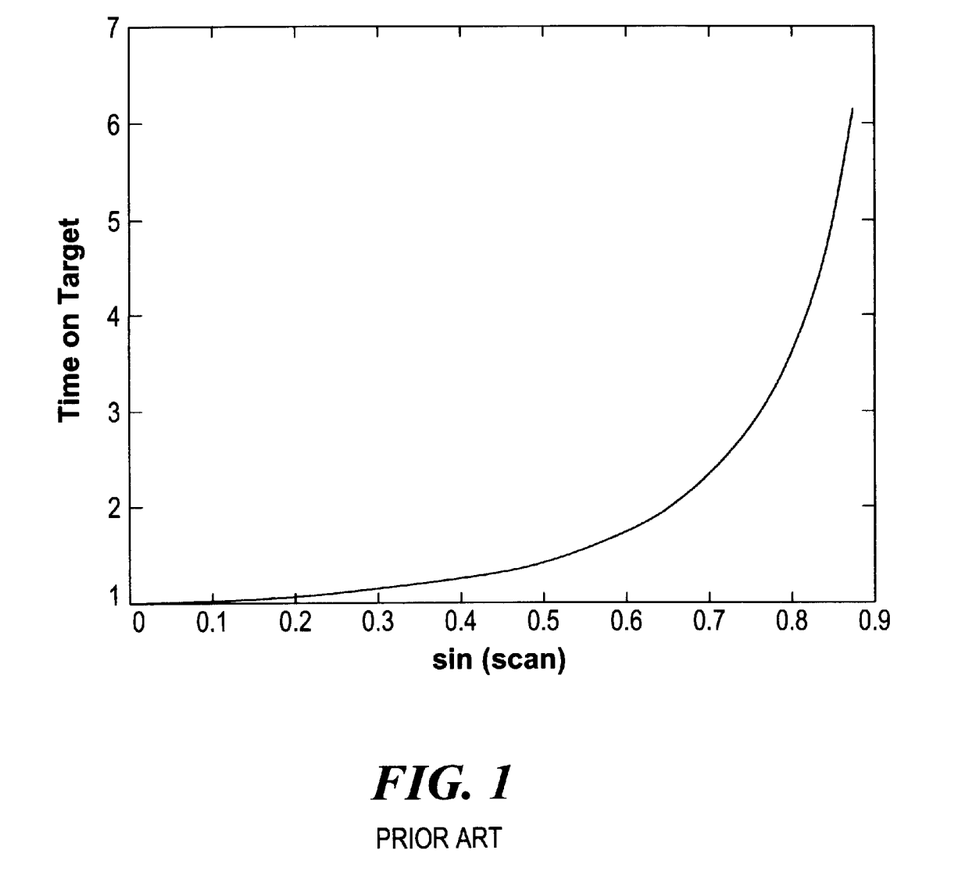
FIG. 1 is a graphical depiction of a prior art relationship between time of target and scan angle.

Phased array radars can have multiple faces each with a predetermined field of view. For example, for a phased array radar having three faces, each face can have a one hundred and twenty degree field of view. While this arrangement may cover three hundred and sixty degrees, there are certain disadvantages associated with such a configuration. The dwell time for a target near the scan boundary of an antenna face, e.g., sixty degrees off boresite, can become unacceptably long since the so-called time on target should be maximized while signal gain is decreased as the scan angle increases. FIG. 1 graphically illustrates the relationship between time on target versus scan angle for an exemplary prior art three-faced radar system. The threshold time on target increases dramatically beyond a certain scan angle.

As known to one of ordinary skill in the art, relatively long dwell times can degrade the overall performance of the radar. For example, since a high speed target may move through multiple range and doppler cells during a long dwell, the computations to process the received signal data are relatively complex and thereby require significant processor overhead. So called target strings must be identified and integrated over the dwell. It will be appreciated that the processing time to perform such computations leave relatively little capacity for the processor to execute other necessary functions. Thus, radar complexity and cost is increased due to the increased number of transmit/receive modules that are required to achieve adequate gain levels at maximum scan angles and the concomitant processor capacity.

It would, therefore, be desirable to provide a radar system that increases signal sensitivity at relatively high scan angles to reduce dwell times.

SUMMARY OF THE INVENTION

The present invention provides a multi-faced radar system that cooperatively processes scattered energy from first and second signals, which differ in frequency, transmitted by respective first and second antenna faces. For relatively high scan angles of the first face, first signal return incident upon the first and second antenna faces are combined and second signal return on the first and second antenna faces are combined so as to increase signal sensitivity. The aggregated first and second signal returns are then combined to further increase signal sensitivity. Cooperatively processing first and second signal returns on the first and second antenna faces dramatically decreases the time on target required for relatively high scan angles.

In one embodiment, a radar includes first, second, and third antenna faces spaced from each other so as to cover three hundred and sixty degrees. The first face radiates a first signal having a first frequency and the second face radiates a second signal having a second frequency, which differs from the first frequency. For relatively high scan angles of the first face, e.g., from about 45 degrees to about 60 degrees off boresite, each of the first and second faces illuminate a common area of space so as to provide an overlap region. For a target located in the overlap region, each of the first and second faces receives scattered energy from the first and second signals.

A processor coupled to the first face processes signal energy from the first and second signals individually. The processor is also coupled to the second face for individually processing signal energy from the first and second signals. The first signal energy from the two antenna faces is combined to provide an aggregate first signal return and the second signal energy is combined to provide an aggregate second signal return. This signal aggregation increases the receive cross section to improve the signal sensitivity. In one embodiment, the first signal energy from the first and second faces is combined coherently. More particularly, signal phase information is taken into account. Alternatively, same frequency signals are combined non-coherently using signal amplitudes. The aggregate first and second signals are then combined to further increase signal sensitivity.

By combining signal returns from two faces, for both first and second signals differing in frequency, signal sensitivity is significantly increased and time on target in the overlap region is dramatically reduced.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 2A:
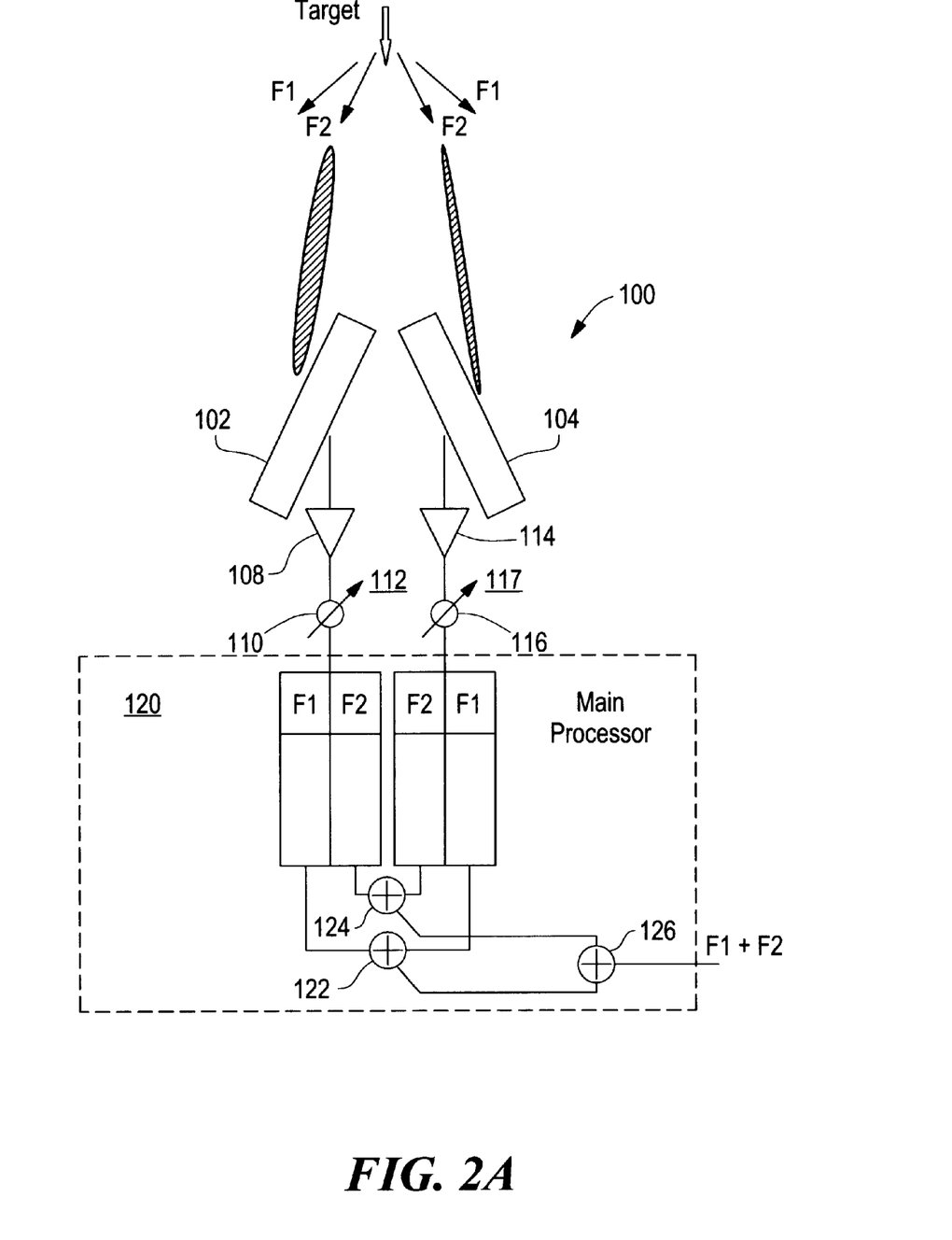
FIG. 2A is a schematic diagram of a radar system in accordance with the present invention having cooperative search and track capability.

FIGS. 2A shows an exemplary embodiment of an antenna system 100 having first, second and third faces 102,104,106, (FIG. 2B) for illuminating an area of space. In one embodiment, the faces comprise phased array antenna elements. As known to one of ordinary skill in the art, a phased array radar is a directive antenna having individual radiating elements that generate a radiation pattern or antenna beam having a shape and direction determined by the relative phases and amplitudes of the currents at the individual radiating elements. By varying the phase, the antenna beam can be steered to a desired direction. In addition, subarrays comprising a subset of the radiating elements can be used to generate multiple independent beams from a single aperture.

Figure 2B:
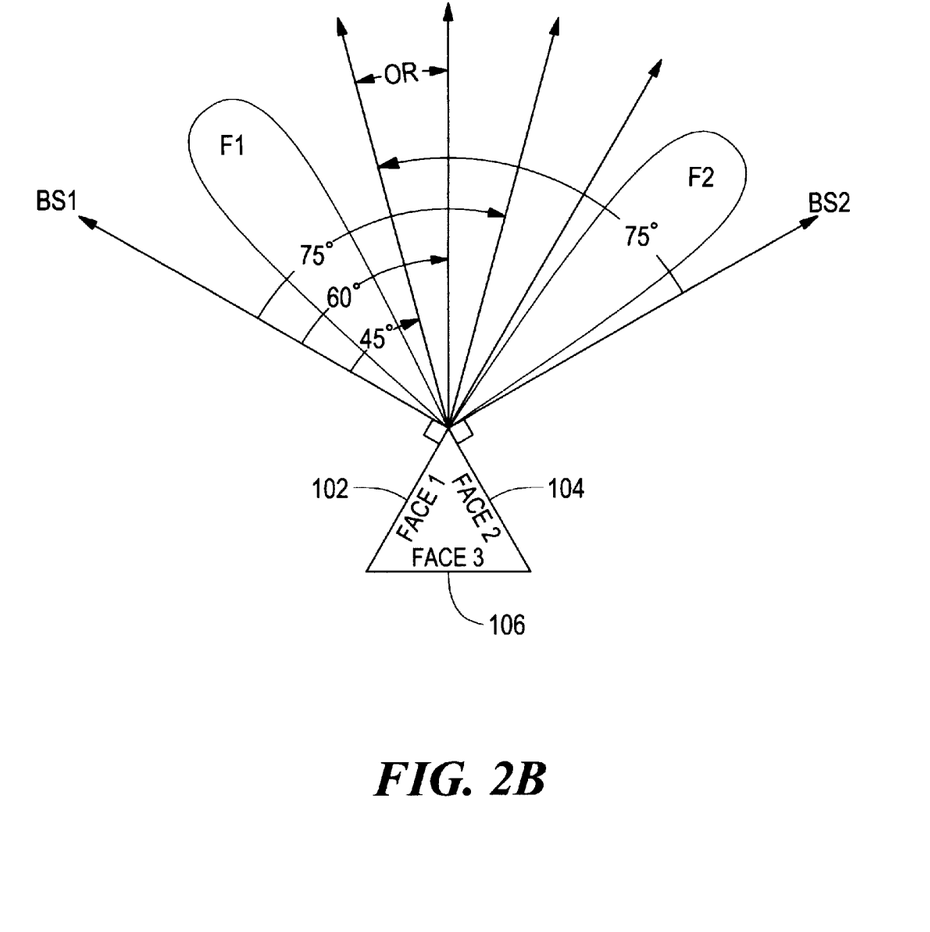
FIG. 2B is a graphical diagram showing an overlap region provided by the radar system of FIG. 2A.

FIG. 2B shows the first, second and third faces 102,104, 106 of the three face radar 100 of FIG. 2A with the faces being equally positioned so as to each have about a one hundred and twenty degree field of view. That is, each face forms about a sixty degree angle with an adjacent face. The first face 102 radiates a first signal F1 having a first frequency and the second face 104 radiates a second signal F2 having a second frequency. For a target in a predetermined overlap region that is radiated by the first and second signals F1,F2, the first and second antenna faces 102,104 each receives scattered energy from the first and second signals.

In one embodiment, the overlap region OR comprises a fifteen degree sector. More particularly, the first face 102 illuminates a region of space from about ±45 degrees off boresight BS1 without cooperation from the second face 104. As known to one of ordinary skill in the art, boresight refers to an axis perpendicular to the antenna face. In the region from about 45 degrees to about 60 degrees off the first face boresight BS1, the second face 104 cooperates with the first face 102 by scanning to an angle of about 75 degrees off its boresight BS2 to provide the fifteen degree overlap region OR. The first and second signal energy scattered by a target in the overlap region OR and received by the first and second antenna faces is cooperatively processed to increase signal sensitivity, as described in detail below.

While FIG. 2B shows scan angles measured from an intersection of adjacent antenna faces to facilitate an understanding of the invention, it is understood that the antenna apertures on the respective faces are spaced apart by a predetermined distance.

Referring again to FIG. 2A, the first and second antenna faces 102,104 are coupled to a signal processing system. The first face 102 is coupled to a first amplifier 108 and a first phase shifter 110 that form a part of a transmit/receive module 112. Similarly, the second face 104 is coupled to a second amplifier 114 and a second phase shifter 116 that form a part of a second transmit/receive module 117. It is well understood by one of ordinary skill in the art that any number of transmit receive modules can be coupled to the antenna faces and that reference to a single transmit/receive module is made to facilitate description and understanding of the invention.

In one embodiment, the first and second phase shifters 110,116 are set to a value corresponding to the average of the frequencies of the first and second signals F1,F2. For search and track bandwidths between about 10 Mhz and 20 Mhz wide, it will be understood by one of ordinary skill in the art that the dispersion (the difference in signal time of arrival at each face) is negligible at these bandwidths when the phased array faces are within proximity of each other.

A main processor 120 is coupled to the first transmit/ receive modules 112 for individually processing first and second signal energy received by the first antenna face 102. Similarly, the processor 120 is coupled to the second transmit/receive module 117 for individually processing first and second signal energy received by the second face 104. The processor 120 combines the aggregate first and second signals to increase signal sensitivity and decrease dwell times for higher scan angles.

In general, first and second receivers coupled to the first face downconvert the first and second signal returns and the processor 120 first combines the same frequency signal return from the first and second faces 102,104 and then combines the different frequency return to increase the overall signal sensitivity. More particularly, the first transmit/receive module 112 individually downconverts first and second signal F1,F2 return from the first antenna face 102 and the second transmit/receive module 117 downconverts the signal returns from the second face 104. The first signal F1 returns from the first and second faces 102,104 are combined by a first signal summer 122 and the second signal F2 returns are combined by second signal summer 124 such that the receive cross section is about twice that of a single array face. This increase in receive cross section provides about a 3 db improvement in signal sensitivity. The doubling of the signal capture area, or cross section, doubles the signal strength for a 3 dB improvement in sensitivity. After the first and second signal returns from each of the first and second faces are combined, the aggregate first signal return and the aggregate second signal return are combined by a main summer 126, again doubling the available signal energy for an increased signal sensitivity of an additional 3 dB, which provides a total increase of about 6 db.

Figure 3:
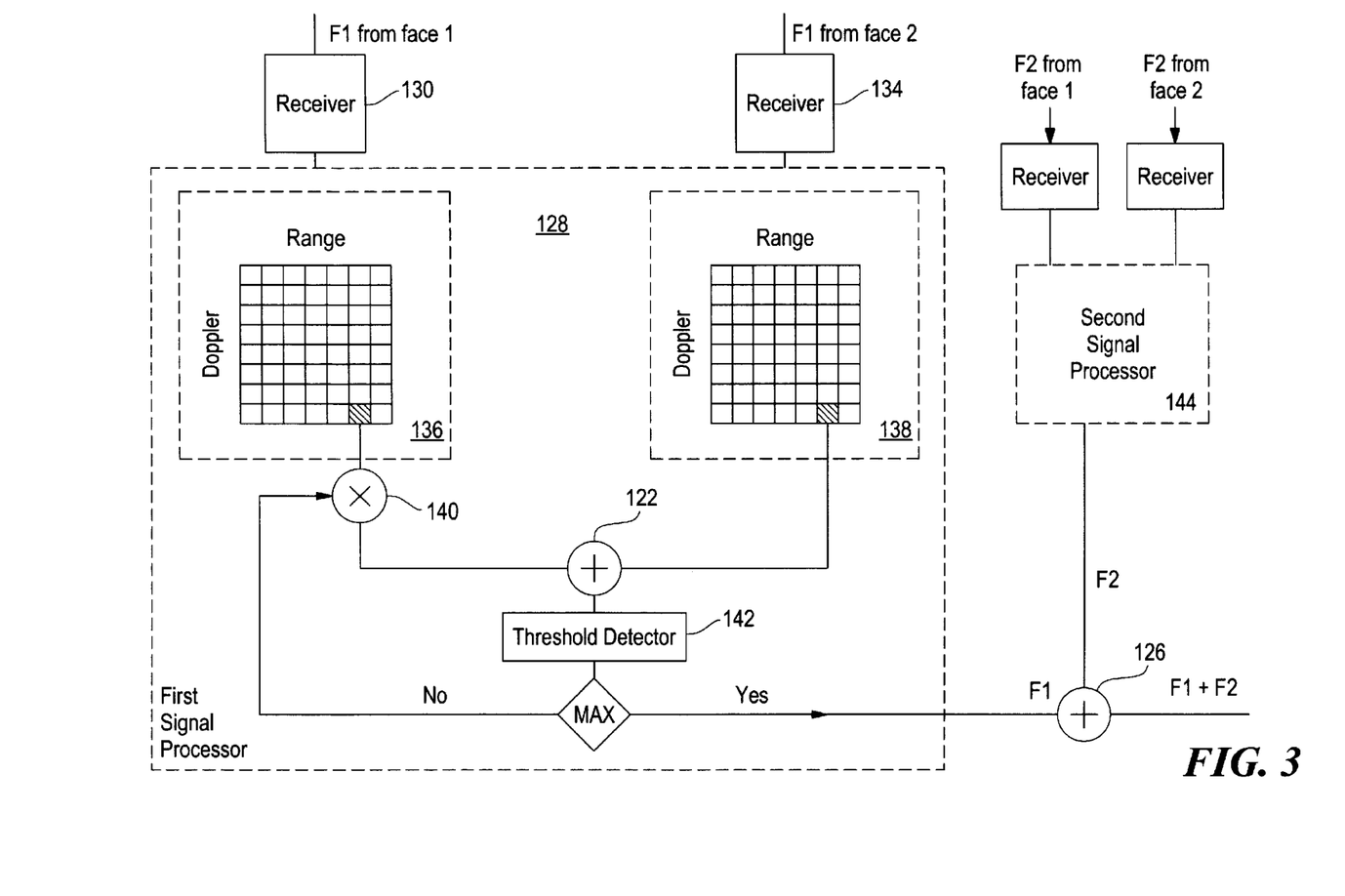
FIG. 3 is a schematic diagram of an exemplary embodiment including a processor forming a part of the radar system of FIG. 2B.

FIG. 3 shows further processing details for an exemplary embodiment of the cooperative radar of FIG. 2A for coherently combining signal return, e.g., first signal F1 return, from the first and second antenna faces 102,104. It is understood that for coherent signal processing phase information for the signals is taken into account. The main processor 120 includes a first signal processor 128 coupled to a first receiver 130 from the first antenna face 102 and to a second receiver 134 from the second antenna face 104. The first receiver 130 provides first signal F1 energy from the first face and the second receiver 134 provides first signal energy F1 from the second face 104. The first signal processor 128 includes first and second range/doppler processors 136,138 for determining the first signal energy F1 from the respective first and second antenna faces for range/ doppler cells or bins. Range/doppler processing of a signal return is well known to one of ordinary skill in the art. A first phase shifter 140 has an input coupled to the output of the first range/doppler processor 136 and an output coupled to the first signal summer 122, which is also coupled directly to the output of the second range/doppler processor 138. A threshold detector 142 receives the output of the first signal summer 122.

The main processor includes a second signal processor 144 which mirrors that of the first signal processor 128 for processing second signal F2 return from each of the first and second antenna faces 102,104. The second signal processor 144 combines the second signal F2 return from the first and second faces and provides the aggregate second signal return to the summer 126 in the main processor 120.

It is understood that reference to different processors in the above description is made to facilitate an understanding of the invention. It will be readily apparent to one of ordinary skill in the art that the signal processing performed by the radar system can be partitioned in alternative embodiments without departing from the present invention.

In operation, the first range/doppler processor 136 determines the first signal return from the first antenna face 102 and outputs a value for a first range/doppler cell to the phase shifter 140. The second range/doppler processor 138 determines the first signal return from the second face 104 and outputs a value for the first range/doppler cell to the first signal F1 summing junction 122. The threshold detector 142 determines whether the first signal return combined from the first and second faces for the corresponding range/doppler cell is greater than a predetermined threshold. In one embodiment, the threshold detector sets a floor below which the signal is ignored. This ensures that noise or extraneous signals are not seen as a target detection. This is well understood by those skilled in the art.

In one embodiment, combinations of complex voltages are attempted until the maximum signal is derived. This can be achieved by combining the vectors (complex, amplitude and phase signals from the faces) with several different relative phases, storing the intermediate results, and selecting the largest signal formed from this process. The maximum signal is the result of the combination that corresponds to the two signal vectors coming into alignment. The resultant maximum aggregate first signal F1 return (for each range/doppler cell) is then provided to the main summer 126 for combining with the maximum aggregate second signal F2 return. It is understood that the range/doppler matrix is formed on a dwell basis so that improving signal sensitivity decreases the signal strength required to make a detection.

Figure 4:
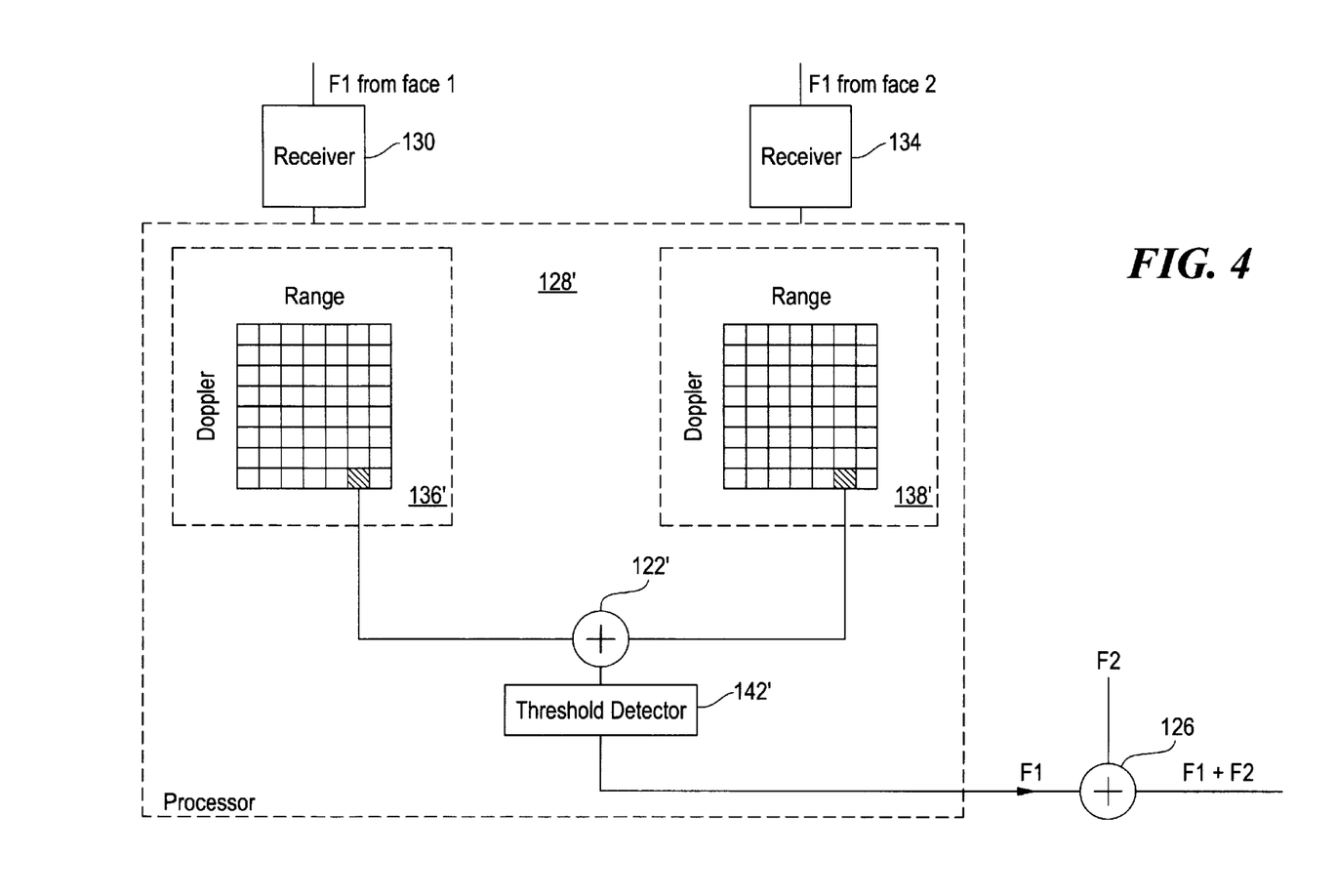
FIG. 4 is a schematic diagram of an alternative embodiment including a processor forming a part of the radar system of FIG. 2B.

FIG. 4 shows an exemplary embodiment of a cooperative radar for non-coherently processing the first and second signal F1,F2 returns from the first and second antenna faces 102,104. That is, the signal amplitudes are combined and the phase of the return signals is not considered. The first receiver 130 is coupled to the first antenna face 102 and the second receiver 134 is coupled to the second antenna face 104. The first and second receivers each receive return from the first signal F1. The first range/doppler processor 136' determines the first signal F1 return from the first face for the range/doppler bins and the second range/doppler processor 138' determines the first signal F1 return of the second face for the range/doppler bins. The first signal summer 122' receives the outputs from the first and second range/doppler processors 136', 138' and provides an output to the threshold detector 142'. The output of the threshold detector 142' is received by the main signal summer 126 for combination with the second signal F2 return.

The second signal F2 return from the first and second antenna faces 102,104 is combined in a similar manner and provided to main signal summer 126. The combined first and second signal F1,F2 returns are used for range/doppler integration over the dwell in a manner well known to one of ordinary skill in the art.

In an exemplary embodiment, the first and second signals have frequencies that differ by a predetermined amount. The frequencies of the first and second signals can vary from about 200 MHz to about 96 GHz. In one embodiment, the frequency difference between the first and second signals F1,F2 transmitted by the respective first and second antenna faces is about 40 MHz. It will be readily apparent to one of ordinary skill in the art that the frequency separation between the first and second signals can vary provided that the difference is consistent with the bandwidth of the signals.

Figure 5:
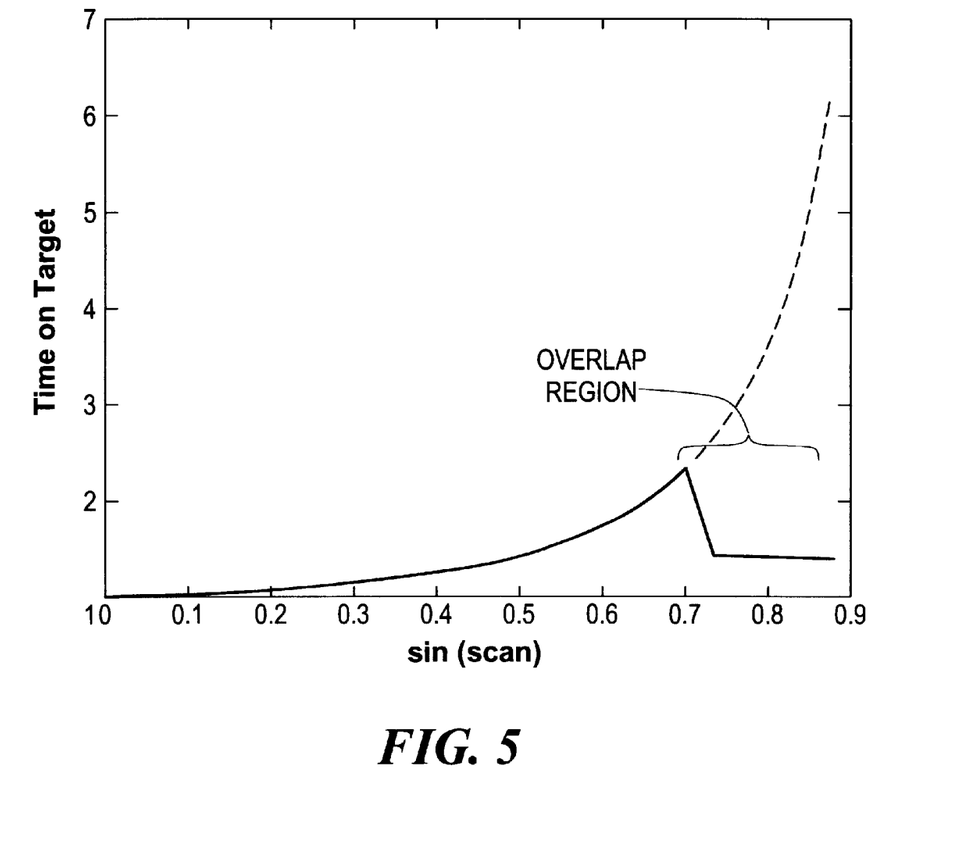
FIG. 5 is a graphical depiction of time on target versus scan angle for a cooperative radar system in accordance with the present invention.

FIG. 5 shows an exemplary illustration of the time on target required for a three-faced cooperative radar in accordance with the present invention as compared to a conventional three faced radar. In general, the time on target gently increases until the scan angle reaches about forty five degrees (sin 45°=0.707). For scan angles greater than about forty five degrees, the radar enters cooperative mode as described above, thereby reducing the time on target as compared with a conventional, non-cooperative radar system. The time on target required for an exemplary non-cooperative radar is indicated with a dashed line. It will be appreciated that the cooperative radar of the present invention significantly reduces the time on target at relatively large scan angles, e.g., greater than about forty-five degrees.

The present invention provides a radar that dramatically reduces dwell times at high scan angles as compared to conventional radars. Further, the invention uses single channel receive modules which are readily available and low cost. Since search and track bandwidths are typically 10–20 MHz wide, phase shifters can be set to a frequency midway between the first and second transmit signal frequencies. In addition, distance between faces is not a critical factor since the phase difference between the first and second signals is disregarded in non-coherent processing or is taken into account by coherent processing that adjusts the phase combination of the signals to maximize voltage. Also, frequency diversity provided by cooperative processing in accordance with the present invention reduces target fluctuation loss. And while described above for three antenna faces, it is understood that the invention is equally applicable for radars having four or more antenna faces, which need not be co-located.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A radar system, comprising:
   a first antenna face for generating a first plurality of beams to illuminate a first region of space with a first signal having a first frequency;
   a second antenna face for generating a second plurality of beams to illuminate a second region of space with a second signal having a second frequency that differs from the first frequency by a predetermined amount, wherein a first one of the first plurality of beams overlaps with a first one of the second plurality of beams to form an overlap region when a scan angle of the first one of the first plurality of beams is greater then a predetermined threshold for minimizing dwell time at scan angles greater than the predetermined threshold;
   a first transmit/receive module coupled to the first face;
   a second transmit/receive module coupled to the second face; and
   a processor coupled to the first and second transmit/receive modules,
   wherein the first face receives first and second signal energy reflected from a target in the overlap region and the second face receives first and second signal energy from the target in the overlap region, and the processor cooperatively processes the first and second signal returns from the first and second antenna faces.

2. The radar system according to claim 1, further including a third antenna face.

3. The radar system according to claim 2, wherein the first, second, and third antenna faces each have a one hundred and twenty degree field of view.

4. The radar system according to claim 1, wherein the first and second regions of space overlap by about fifteen degrees.

5. The radar system according to claim 1, wherein the first and second antenna faces form an angle of about sixty degrees.

6. The radar system according to claim 1, wherein the first and second regions of space overlap in a sector defined by about forty five degrees and about sixty degrees off boresite of the first antenna face.

7. The radar system according to claim 1, wherein the predetermined threshold is about forty-five degrees off boresite.

8. The radar system according to claim 1, further including
- a first receiver coupled to the first antenna face for receiving first signal return from the first antenna face;
- a second receiver coupled to the second antenna face for receiving first signal return from the second antenna face; and
- a first signal processor coupled to the first and second receivers for combining the first signal returns from the first and second receivers;
- a third receiver coupled to the first antenna face for receiving second signal return from the first antenna face;
- a fourth receiver coupled to the second antenna face for receiving second signal return from the second antenna face;
- a second signal processor coupled to the third and fourth receivers for combining second signal return from the first and second antenna faces; and
- a main signal summer for combining the first signal return from the first signal processor and the second signal return from the second signal processor.

9. The radar system according to claim 8, wherein the first signal processor includes
- a first range/doppler processor coupled to the first receiver for range/doppler processing of the first signal return for the first receiver;
- a second range/doppler processor coupled to the second receiver for range/doppler processing of the first signal return for the second receiver; and
- a first signal summer coupled to the first and second range/doppler processors for combining the first signal returns from the first and second range/doppler processors.

10. The radar system according to claim 9, further including a phase selector coupled between the first range/doppler processor and the first signal summer.

11. The radar system according to claim 10, further including a threshold detector for, in combination with the phase selector, maximizing an output of the first signal summer.

12. A method of cooperative radar processing, comprising:
- radiating a first signal beam having a first frequency from a first antenna face;
- radiating a second signal beam having a second frequency from a second antenna face such that the first and second signals illuminate a common region of space when a scan angle of the first signal beam is greater than a predetermined threshold for reducing a dwell time, wherein the first antenna face is angled with respect to the second antenna face;
- receiving scattered energy from a target in the common region of space including receiving first signal energy on the first and second antenna faces and receiving second signal energy on the first and second antenna faces;
- combining the first signal energy from the first and second antenna faces to form an aggregate first signal return;
- combining the second signal energy from the first and second faces to form an aggregate second signal return; and
- combining the aggregate first and second signal returns.

13. The method according to claim 12, wherein the first and second antenna faces form about a sixty degree angle and the common region of space includes a sector from about 45 to about 60 degrees off boresite of the first antenna face.

14. The method according to claim 13, wherein the common region of space includes a sector from about sixty degrees to about seventy-five degrees off boresite of the second antenna face.

15. The method according to claim 12, further including combining the first signal return from the first and second antenna faces coherently.

16. The method according to claim 12, further including setting phase shifters for adjusting the phase of the first and second signal return to a value corresponding to an average of the first and second signals.

17. The method according to claim 12, further including selecting a dwell time for a first scan angle for the first antenna face that is less than a dwell time for a second scan angle for the first antenna face, wherein the first scan angle is greater than the second scan angle.

18. The method according to claim 12, further including
- range/doppler processing the first signal return from the first antenna face; and
- range/doppler processing the first signal return from the second antenna face prior to combining the first signal energy.

19. The method according to claim 18, wherein combining the first signal energy further includes adjusting the phase of the range/doppler processed first signal return from the first antenna face prior to combining the return with the range doppler/processed first signal return from the second antenna face for maximizing the combined first signal energy.

20. A method of cooperative radar processing, comprising:
- radiating a first signal having a first frequency from a first antenna face;
- radiating a second signal having a second frequency from a second antenna face such that the first and second signals illuminate a common region of space, wherein the first antenna face is angled with respect to the second antenna face;
- receiving scattered energy from a target in the common region of space including receiving first signal energy on the first and second antenna faces and receiving second signal energy on the first and second antenna faces;
- combining the first signal energy from the first and second antenna faces to form an aggregate first signal return;
- combining the second signal energy from the first and second faces to form an aggregate second signal return; and
- combining the aggregate first and second signal returns, wherein a dwell time decreases after entering the common region of space.

* * * * *